United States Patent [19]

Arsenault et al.

[11] Patent Number: 4,789,233
[45] Date of Patent: Dec. 6, 1988

[54] EYEGLASS WIPERS

[76] Inventors: Edna M. Arsenault, Gilbertville Rd., Ware, Mass. 01082; George Spector, 233 Broadway, Rm. 3815, New York, N.Y. 10007

[21] Appl. No.: 53,042
[22] Filed: May 22, 1987
[51] Int. Cl.4 ................................................. G02C 1/00
[52] U.S. Cl. ........................................ 351/158; 351/41
[58] Field of Search .......................... 351/158, 41, 62; 15/250.27, 250.30; 2/435, 436, 438

[56] References Cited
FOREIGN PATENT DOCUMENTS 795771  3/1936  France .................................. 351/158

OTHER PUBLICATIONS

Copeland, New York Daily News, Mar. 4, 1956.

Primary Examiner—Rodney B. Bovernick
Assistant Examiner—P. M. Dzierzynski

[57] ABSTRACT

Eyeglass wipers are provided for a pair of eyeglasses embodying a frame with a pair of lenses therein. Each of the eyeglass wipers consists of a wiper arm mounted at one end to a housing pivotly connected to one end and positioned forwardly of the frame. A mechanism is built into the housing for manually swinging the wiper arm across surface of the lenses and spraying lense cleaning fluid from the wiper arm onto the surface of the lense for maintaining the lense clean.

1 Claim, 1 Drawing Sheet

U.S. Patent  Dec. 6, 1988  4,789,233
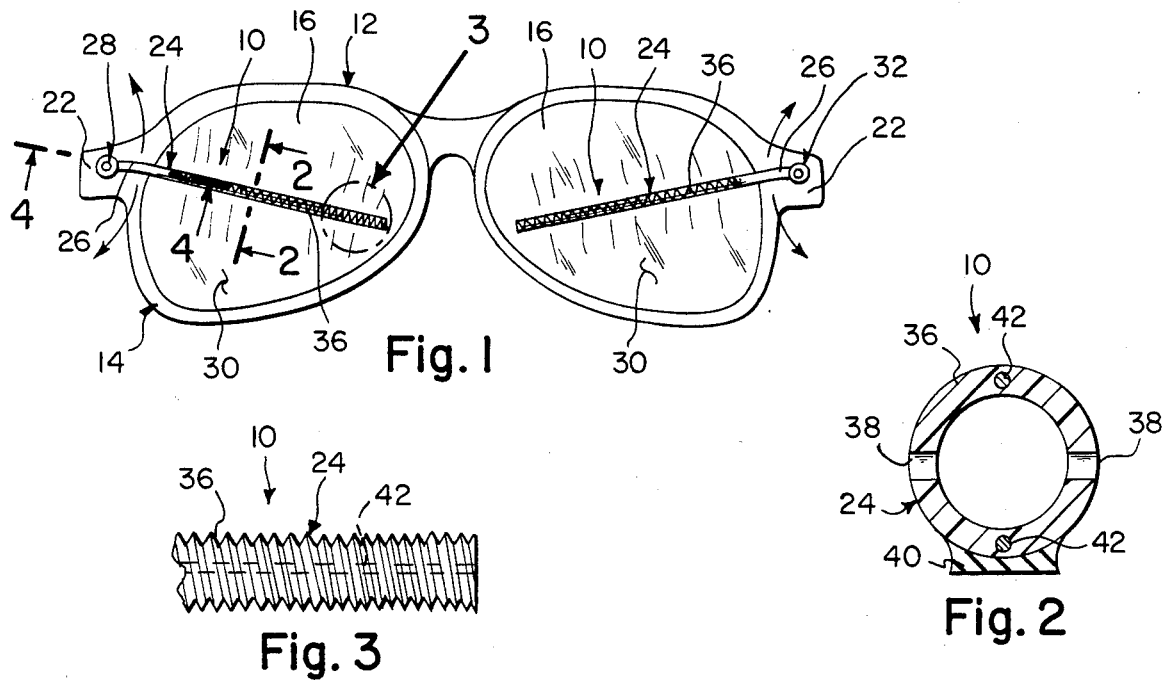
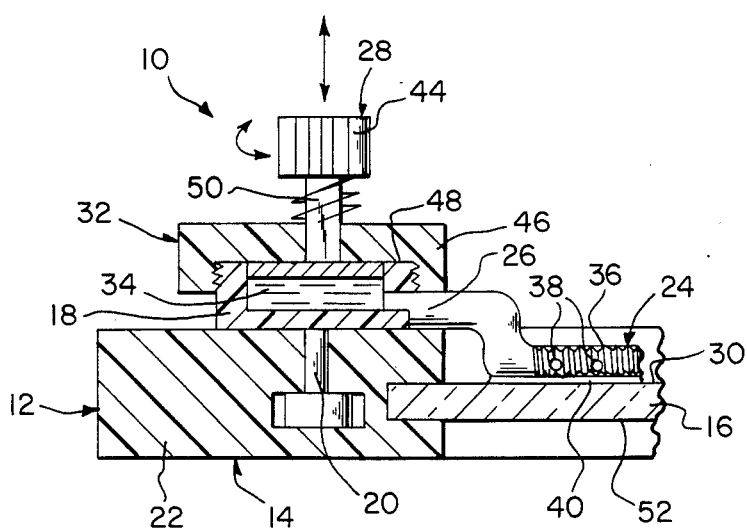

EYEGLASS WIPERS

BACKGROUND OF THE INVENTION

The instant invention relates generally to eyeglasses and more specifically it relates to eyeglass wipers.

Numerous eyeglasses have been provided in prior art that are adapted to include mechanisms which will keep the eyeglasses clean of water, steam and the like. For example, U.S. Pat. Nos. 2,888,703; 3,160,735 and 3,754,298 all are illustrative of such prior art. While these units may be suitable for the particular purpose to which they address, they would not be as suitable for the purposes of the present invention as heretofore described.

SUMMARY OF THE INVENTION

A primary object of the present invention is to provide eyeglass wipers that will overcome the shortcomings of the prior art devices.

Another object is to provide eyeglass wipers that are built within frame of the eyeglasses and can be manually operated by the wearer of the eyeglasses.

An additional object is to provide eyeglass wipers that includes washer fluid chambers formed within which can be manually activated to spray the fluid directly from the wipers onto the lenses so as to properly clean the lenses.

A further object is to provide eyeglass wipers that is simple and easy to use.

A still further object is to provide eyeglass wipers that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front elevational view of eyeglasses within invention therein.

FIG. 2 is an enlarged cross sectional view taken along line 2—2 in FIG. 1 through the accordian tube.

FIG. 3 is an enlarged view of the accordian tube as indicated by numeral 3 in FIG. 1.

FIG. 4 is an enlarged cross sectional view taken along line 4—4 in FIG. 1 showing the spray wiper mechanism in greater detail.

DETAILED DESCRIPTION OF THE PREFERRED EMBODIMENTS

Turning now descriptively to the drawings, in which similar reference characters denote similar elements throughout the several views, FIGS. 1 through 4 illustrate eyeglass wipers 10 for a pair of eyeglasses 12 embodying a frame 14 with a pair of lenses 16 therein. Each of the eyeglass wipers 10 contains a housing 18 pivotly connected with a shaft 20 to one end 22 of the frame 14 and positioned forwardly of the frame. A wiper arm 24 is for maintaining one of the lenses 16 clean. The wiper arm 24 is mounted at one end 26 to the housing 18. A first mechanism 28 is for manually swinging the wiper arm 24 across surface 30 of the lense 16. A second mechanism 32 is for spraying lense cleaning fluid 34 from the wiper arm 24 onto the surface 30 of the lense 16.

The wiper arm 24 consists of an elongated flexible accordian tube 36 that has two sets of spaced apart holes 38. The sets of holes 38 are placed in the tube 36 at opposite sides thereof. A blade 40 is formed on underside of the tube 36. A pair of wires 42 are provided with each positioned longitudinally within the tube 36 with one wire 42 on top and other wire on bottom to bias the tube 36 downwardly with the blade 40 against the lense 16.

The first mechanism 28 includes a knurled knob 44 extending outwardly from the housing 18 so that when the knurled knob 44 is manually turned the housing 18 will pivot swinging the wiper arm 24 mounted thereto across the surface 30 of the lense 16.

The second mechanism 32 consists of the housing 18 including a cap cover 46 threaded onto an open top 48 of the housing for fluidly holding the one end 26 of the wiper arm 24 thereto. A spring biased square shafted piston 50 is mounted within the cap cover 46 with the knurled knob 44 affixed thereto. When the knurled knob 44 is manually pushed inwardly the piston 50 will force the lense cleaning fluid 34 from the housing 18 into the wiper arm 24 and outwardly from the two sets of holes 38 for spraying onto the surface 30 of the lense 16.

A similar set of eyeglass wipers 10, not shown, can be positioned inwardly of the frame 14 to clean inner surface 52 of the lenses 16 and be manually operated in the same manner as the eyeglass wipers 10 illustrated in the drawings.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. Eyeglass wipers for a pair of eyeglasses embodying a frame with a pair of lenses therein, each of said eyeglass wipers comprising:
   (a) a housing pivotly connected to one end of the frame and positioned forwardly of the frame;
   (b) a wiper arm for maintained at least one of the lenses clean, said wiper arm mounted at one end to said housing;
   (c) means for manually swinging said wiper arm across the surface of the lens;
   (d) means for spraying lens cleaning fluid from said wiper arm onto the surface of the lense, wherein said wiper arm comprises:
   (e) an elongated flexible accordion tube having two sets of spaced apart holes, the sets of holes placed in said tube at opposite sides thereof;
   (f) a blade formed on the underside of said tube adjacent the lens surface;
   (g) a pair of wires, each positioned longitudinally within said tube with one wire on top and other wire on bottom to bias the tube downwardly with said blade against the lens; wherein said manually swinging means includes a knurled knob extending outwardly from said housing so that when said knurled knob is manually turned said housing will pivot swinging wiper arm mounted thereto across the surface of the lens, wherein said spraying means comprises:

(h) said housing including a cap cover threaded onto an open top of said housing for holding the one end of said wiper arm thereto; and (i) a spring biased square shafted piston mounted within said cap cover with said knurled knob affixed thereto so that when said knurled knob is manually pushed inwardly said piston will force the lens cleaning fluid from said housing into said wiper arm and outwardly from the two sets of holes for spraying onto the surface of the lense.

* * * * *